Sept. 19, 1967  S. H. MICK  3,342,462
FUEL SYSTEM
Filed Feb. 23, 1966  2 Sheets-Sheet 1

INVENTOR.
Stanley H. Mick
BY
C. K. Veenstra
ATTORNEY

Sept. 19, 1967  S. H. MICK  3,342,462
FUEL SYSTEM
Filed Feb. 23, 1966  2 Sheets-Sheet 2

INVENTOR.
Stanley H. Mick
BY
C. K. Veenstra
ATTORNEY 3,342,462
FUEL SYSTEM
Stanley H. Mick, St. Clair Shores, Mich., assignor to General Motors Corporation, Detroit, Mich., a corporation of Delaware
Filed Feb. 23, 1966, Ser. No. 529,419
1 Claim. (Cl. 261—23)

This invention relates to internal combustion engine fuel systems employing air valve control of the fuel metering and more particularly relates to controls which, if employed in an air valve carburetor, enhance the mixture and distribution of air and fuel in the carburetor mixture conduit.

Prior air valve carburetors employ a butterfly type air valve which is controlled to maintain a constant pressure downstream in the mixture conduit. The position of the valve is thus determined by and indicative of the rate of air flow to the engine. The air valve positions a fuel metering rod to control fuel flow in accordance with air flow. However, such valves tend to split the air stream through the mixture conduit into two portions, thereby making it difficult to introduce fuel into the air stream and obtain proper mixture and distribution of the air and fuel.

This invention provides an air valve carburetor which has a pair of inwardly opening air valves providing a central aperture to direct air flow through the mixture conduit in a single stream. Fuel is introduced into the middle of the stream through a nozzle positioned in the center of the mixture conduit The air valves are notched to fit around the nozzle structure thereby providing a low carburetor silhouette.

In addition, this carburetor includes means to seal the area between the air valve shafts and the walls of the mixture conduit so that all air flow through the mixture conduit enters through the central aperture provided by the air valves.

In this carburetor, fuel flow is regulated by a metering rod which cooperates with an orifice in the discharge nozzle to meter fuel as it is discharged into the air stream. This arrangement thus avoids difficulties encountered in other air valve carburetors wherein the formation of vapor bubbles in the metered fuel disturbs proper fuel discharge into the air stream. The metering rod cooperates with an air bleed to vary the amount of air bled into the metered fuel. A fuel emulsion is thus formed which improves the distribution of fuel in the mixture conduit.

The details as well as other objects and advantages of this invention are disclosed in the following description and in the drawings in which.

Figure 1:
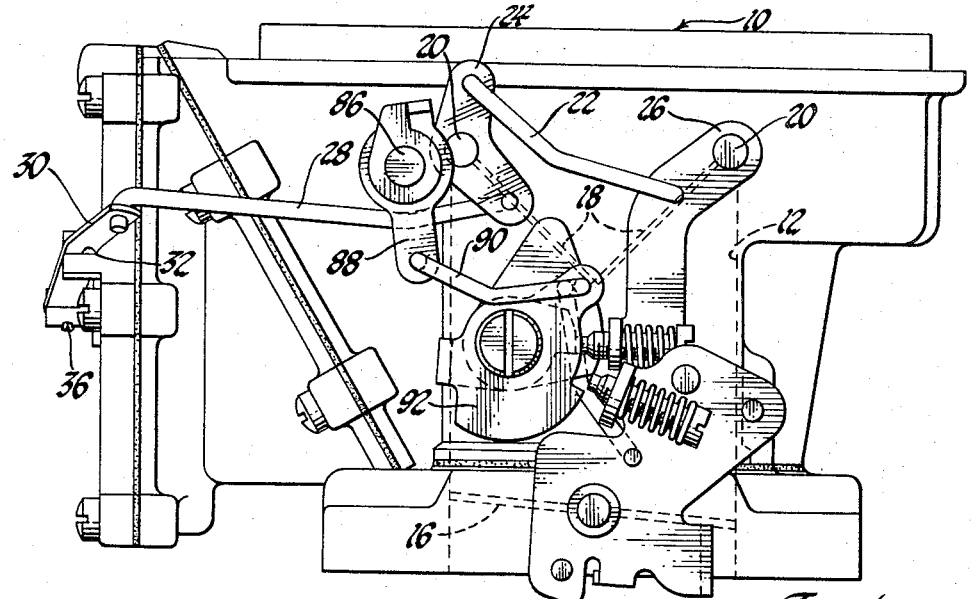
FIGURE 1 is a side elevational view of an air valve carburetor illustrating the linkage controlling the air valve position.

Referring to the drawings, a carburetor 10 has a pair of mixture conduits 12 with a common rectangular air inlet 14. Throttle valves 16 control flow through mixture conduits 12 in the conventional manner. A pair of inwardly opening air valves 18 are disposed in air inlet 14 on shafts 20. A link 22 extends between a pair of levers 24 and 26 secured to air valve shafts 20 so that air valves 18 move simultaneously.

Figure 3:
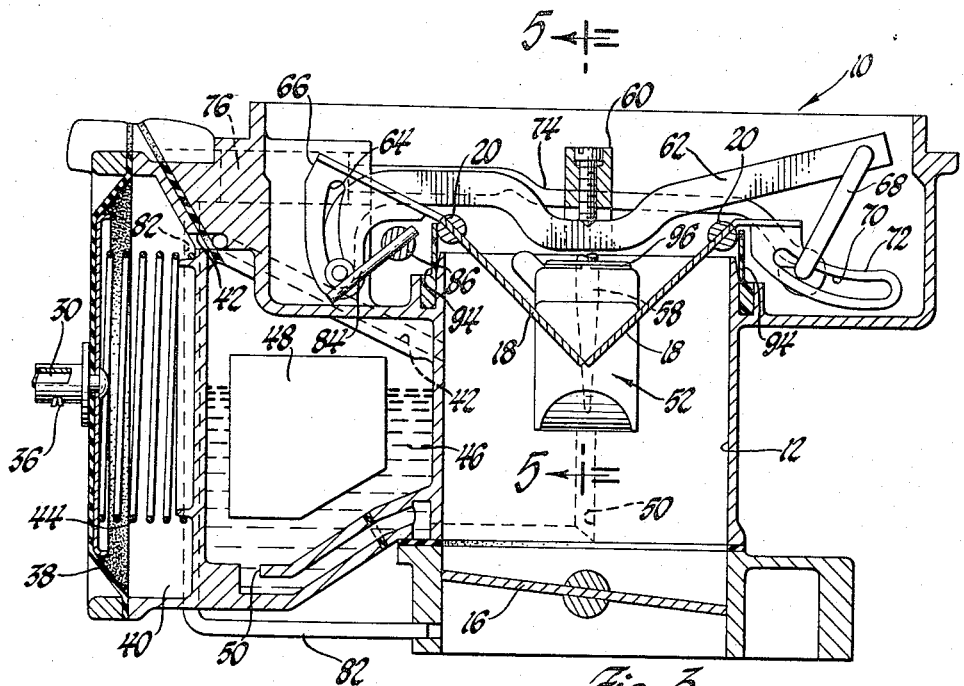
FIGURE 3 is a sectional view along line 3—3 of FIGURE 2 illustrating the disposition of the fuel discharge nozzle within the mixture conduits.

A link 28 extends from lever 24 to a lever 30 which is pivoted at 32 and is secured at 36 to a flexible diaphragm 38. As shown in FIGURE 3, the left side of diaphragm 38 is exposed to atmospheric pressure while the chamber 40 to the right of diaphragm 38 communicates through a passage 42 with the pressure in mixture conduit 12 below air valves 18. Means such as the spring 44 bias diaphragm 38 and air valves 18 to the closed position and cooperate with diaphragm 38 to position air valves 18 so that a constant pressure is maintained in mixture conduits 12 downstream of air valves 18. By this means, air valves 18 are opened to increase the air flow area as the engine requires a greater air flow, the position of air valves 18 being responsive to and indicative of the rate of air flow to the engine.

Figure 2:
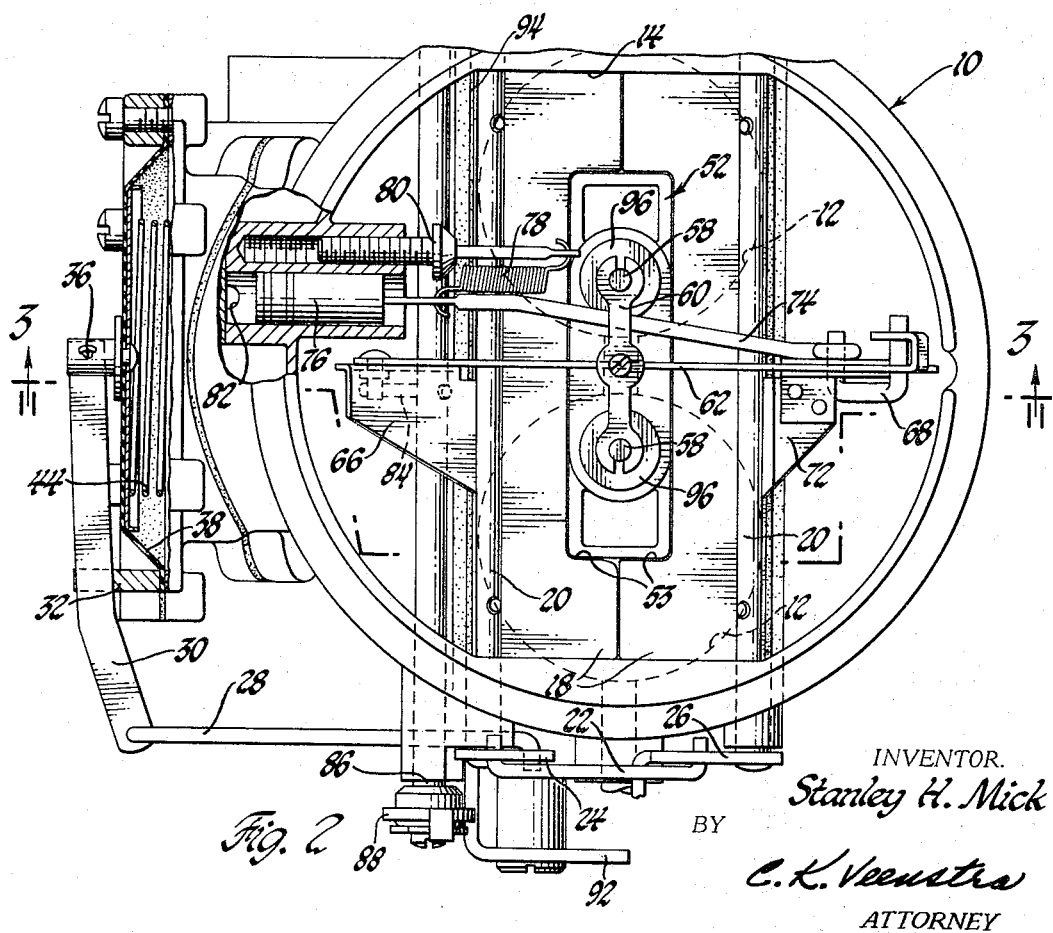
FIGURE 2 is a top plan view of the carburetor of FIGURE 1, shown partially in section and illustrating the linkage controlling the metering rods.
Figure 5:
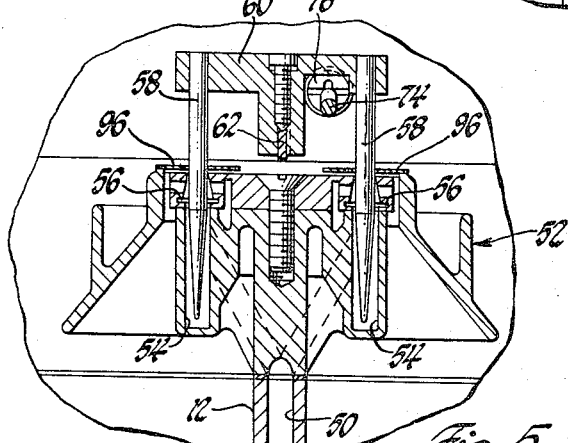
FIGURE 5 is a sectional view along line 5—5 of FIGURE 3 illustrating the cooperation of the metering rods with the air bleed.

As shown in FIGURES 3 and 5, a fuel bowl 46 is maintained at a substantially constant level by a conventional float mechanism 48. A passage 50 extends from fuel bowl 46 upwardly between mixture conduits 12 to the nozzle 52 located therein. (As shown in FIGURE 2, air valves 18 are notched at 53 to fit about nozzle 52.) Fuel flow through passage 50 is divided, as shown in FIGURE 5, into a pair of receivers 54 from which it is metered past orifices 56 and discharged into mixture conduits 12. Fuel flow through orifices 56 is varied by a pair of metering rods 58 which are supported in a bracket 60 mounted on an operating arm 62.

One end of arm 62 is supported in a slot 64 formed in a tab 66 secured to one air valve 18. The other end of arm 62 is supported by a link 68 in slot 70 formed in a tab 72 secured to the other air valve 18. As air valves 18 open, slots 64 and 70 and link 68 raise arm 62 to lift metering rods 58 and increase the effective fuel discharge area of orifice 56. Thus fuel flow to mixture conduits 12 is controlled in accordance with air flow therethrough.

A link 74 controls the angular position of link 68 within slot 70. Link 74 is connected to a piston 76 which is biased to the right by a spring 78 as shown in FIGURE 2. An adjustable stop 80 controls the tension of spring 78. A passage 82 subjects piston 76 to the pressure in mixture conduit 12 downstream of throttles 16. Piston 76 thus senses the engine's requirement for an enriched power mixture and, under conditions of low vacuum below throttles 16, pushes link 68 toward the right end of slot 70. Thus, when air valves 18 open, metering rods 58 will be lifted further from orifices 56 to increase fuel flow and provide an enriched mixture.

A pin 84 controls the position of arm 62 within slot 64. Pin 84 is carried by a shaft 86 which is operated by a conventional automatic choke mechanism, not shown. As shown in FIGURE 1, shaft 86 positions a lever 88 and a link 90 to control a fast idle cam 92 in a conventional manner. The illustrated position of pin 84 and shaft 86 is that assumed when the carburetor is subjected to normal operating temperatures. Should the temperature decrease, shaft 86 will rotate clockwise and pin 84 will raise arm 62 within slot 64. Metering rod 58 is thus withdrawn from orifice 56 to increase fuel flow and provide an enriched air-fuel mixture for idle and low speed operation.

Figure 4:
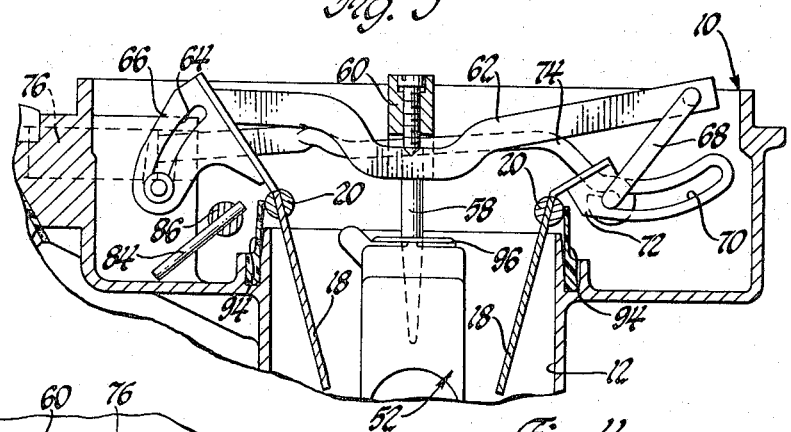
FIGURE 4 is a view similar to FIGURE 3 showing the air valves and metering rods in open position.

As shown in FIGURES 3 and 4, a pair of rubber sealing strips 94 are secured along the sides of the rectangular air inlet 14 and rub against the air valve shafts 20. Sealing strips 94 are biased into contact with air valve shafts 20 by the pressure drop across air valves 18, that is, by the atmospheric pressure above air valves 18 and the air valve depression downstream in mixture conduits 12. Sealing strips 94 prevent air flow between air valve shafts 20 and the walls of mixture conduits 12 so that all air flow through mixture conduits 12 is directed through the central opening provided by air valves 18.

As shown in FIGURES 2 and 5, a pair of shields 96 are disposed above metering orifices 56 and surround metering rods 58. Shields 96 protect fuel metered through orifices 56 from the direct impact of air flow through air inlet 14. As metering rods 58 are withdrawn from orifices 56, the taper on the ends of the metering rods cooperates with the opening in the shields 96 to provide a varying opening through which air bleeds into the stream of metered fuel. This small air flow forms an emulsion of air and fuel which is discharged from nozzle 52 and provides an improved distribution of air and fuel throughout mixture conduits 12.

It will be appreciated that the improvements provided by this invention enhance the efficiency of operation of the air valve carburetor. In particular, the air valve shaft sealing strips and the variable air bleed contribute to the desired distribution of a uniform mixture of air and fuel in the mixture conduits.

I claim:

An internal combustion engine carburetor comprising a downdraft mixture conduit having a rectangular air inlet, a fuel nozzle disposed in said mixture conduit, a fuel bowl, a fuel passage extending from said fuel bowl to a discharge point within said nozzle, a metering orifice in said fuel passage adjacent said discharge point, a metering rod vertically disposed in said mixture conduit and controlling fuel flow through said metering orifice, a shield disposed in said mixture conduit above said nozzle to protect said discharge point from the impact of air flow through said mixture conduit, said shield surrounding said metering rod and having an opening cooperating with said rod to provide a variable air bleed into said nozzle, a pair of shafts disposed adjacent opposite sides of said air inlet, a pair of downwardly extending air valves secured to said shafts for rotation within said air inlet, said air valves being notched to surround said nozzle, means positioning said air valves to maintain a substantially constant pressure drop thereacross whereby the rotative position of said air valves is indicative of the rate of air flow through said air inlet, means connecting said metering rod to said air valves whereby fuel flow to said mixture conduit is controlled in accordance with air flow through said mixture conduit, and sealing strips secured against said opposite walls of said air inlet, said sealing strips being subject to the pressure drop across said air valves and biased thereby into contact with said shafts to prevent air flow between said shafts and the walls of said air inlet.

References Cited

UNITED STATES PATENTS

| | | | |
|---|---|---|---|
| 1,368,451 | 2/1921 | Piat | 261—44 |
| 1,429,534 | 9/1922 | Renner | 261—44 X |
| 1,510,366 | 9/1924 | Whiteman | 261—50 |
| 1,555,489 | 9/1925 | Spencer et al. | 261—44 |
| 1,754,972 | 4/1930 | Waite | 261—50 X |
| 1,773,289 | 8/1930 | Waite | 261—50 |
| 2,264,347 | 12/1941 | Udale | 261—44 X |
| 2,887,309 | 5/1959 | Raynor | 261—50 |

HARRY B. THORNTON, *Primary Examiner.*

TIM R. MILES, *Assistant Examiner.*